United States Patent Office 3,758,341
Patented Sept. 11, 1973

---

3,758,341
HALO (ORGANO) TIN THIOCARBOXYLATES
Anatole Wowk, Edison, N.J., assignor to M & T
Chemicals Inc., New York, N.Y.
No Drawing. Original application June 15, 1970, Ser. No. 46,483, now Patent No. 3,655,613. Divided and this application Oct. 29, 1971, Ser. No. 193,981
Int. Cl. C07f 7/22
U.S. Cl. 260—429.7    4 Claims

ABSTRACT OF THE DISCLOSURE

This invention comprises novel compounds exhibiting the formula:

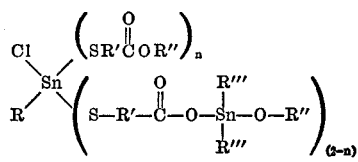

wherein R, R', R" and R"' are hydrocarbons and $n$ is 0 or 1, methods of preparing these novel compounds, and polymers stabilized by these novel compounds against the deteriorative effects of heat and light.

---

This invention relates to novel organotin compounds and to novel stabilized halogen-containing polymer compositions. This application is a divisional application of Ser. No. 46,483, filed June 15, 1970, now U.S. Pat. No. 3,655,613.

This invention comprises novel compounds exhibiting the formula:

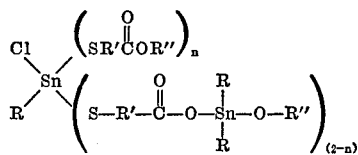

wherein R, R' and R" are hydrocarbons and $n$ is 0 or 1, methods of preparing these novel compounds, and to halogen-containing polymers stabilized by these novel compounds against the deteriorative effects of heat and light.

In the formula R, R' and R" are hydrocarbon radicals selected from the group consisting of alkyl, cycloalkyl, aralkyl, alkaryl, and aryl. X is a halogen atom selected from the group consisting of chlorine, bromine and iodine. When R, R' or R" is alkyl, it may be a straight chain alkyl or a branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes alkyls having less than about 20 carbon atoms. When R, R' or R" is cycloalkyl, it may typically be cyclopentyl, cyclohexyl, cycloheptyl, cyclooctyl, etc. When R, R' or R" is aralkyl, it may typically be benzyl, β-phenylethyl, γ-phenylpropyl, β-phenylpropyl, etc. When R, R' or R" is aryl, it may typically be phenyl, naphthyl, etc. When R, R' or R" is alkaryl, it may typically be tolyl, xylyl, p-ethylphenyl, p-nonylphenyl, etc. R, R' or R" may be inertly substituted, e.g. may bear a non-reactive substituent such as alkyl, aryl, cycloalkyl, aralkyl, alkaryl, ether, etc.

Halogen-containing polymers, including homopolymers and copolymers of vinyl chloride and vinylidene chloride, are materials which have proven useful, because of their desirable physical properties. Uses of these materials have been limited, however, by their inherent instability when exposed to conditions of heat and light. Under such conditions, the halogen-containing polymer may discolor, become brittle, crack, check or otherwise suffer deterioration of its physical properties. Thus, unstabilized chlorine-containing polymer compositions may be highly unsatisfactory for outdoor use where they may be subjected to both heat and light. Various techniques are known for stabilizing these polymers against degradation in the presence of heat alone or light alone but no single stabilizer compound has been found which confers the high degree of both heat and light stability which is required for outdoor use.

A further defect of prior art stabilizers is that they may normally be viscous liquids or pasty gels. They may thus be considerably more difficult to handle than solid materials.

A reaction mechanism for the formation of the novel compounds of this invention is clearly illustrated by the following equations:

$$RSn(OH)_2X + 2HSR'COOR'' = \underset{X}{\overset{R}{Sn}}(SR'COOR'')_2 + 2H_2O$$

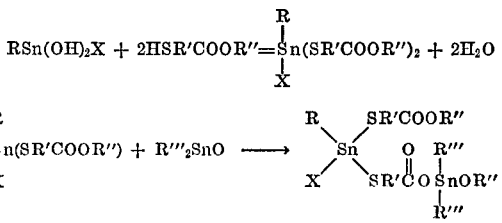

Typical reactants of the formula

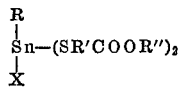

include
monobutylmonochlorotin S,S' bis(isooctyl mercapto-acetate),
monooctylmonochlorotin S,S' bis(isooctyl mercapto-acetate),
monocyclohexylmonochlorotin S,S' bis(isooctyl mercaptoacetate),
monomethylmonochlorotin S,S' bis(isooctyl mercapto-acetate),
monophenylmonochlorotin S,S' bis(isooctyl mercapto-acetate),
monobutylmonochlorotin S,S' bis(lauryl mercapto-acetate),
monobutylmonochlorotin S,S' bis (benzyl mercapto-acetate),
butylchlorotin S,S' bis(isooctyl thioglycollate),
butylchlorotin S,S' bis(dodecyl thioglycollate),
monobutylmonochlorotin S,S' bis(isooctyl propionate),
monooctylmonochlorotin S,S' bis(isooctyl mercapto-propionate),
monocyclohexylmonochlorotin S,S' bis(isooctyl mercapto-propionate),
monomethylmonochlorotin S,S' bis(isooctyl mercapto-propionate),
monophenylmonochlorotin S,S' bis(isooctyl mercapto-propionate),
monobutylmonochlorotin S,S' bis(lauryl mercapto-propionate),
monobutylmonochlorotin S,S' bis(benzyl mercapto-propionate),
monobutylmonochlorotin S,S' bis(isooctyl propionate),
and monobutylmonochlorotin S,S' bis(dodecyl mercapto-propionate).

The reactant $R_2'''SnO$ includes those compounds wherein R''' is a hydrocarbon selected from the group consisting of alkyl, aryl, cycloalkyl, aralkyl, and alkaryl.

Typical of such reactants are such compounds as dimethyltin oxide, dibutyltin oxide, dioctyltin oxide, etc.

These equations graphically show that a reaction occurs between the mercapto radical and the compound $R_2SnO$ whereby water splits off and a chemical bond is formed between the tin and sulfur. These equations further illustrate the necessity for one or two molecules of the organotin oxide per mole of the compound $RSn(OH)_2X$ to obtain the desired reaction and the desired novel compound having a 2:1 ratio of sulfur to tin.

It is within the scope of this invention that pure, impure or commercial grades of the reactants may be employed satisfactorily. In general, pure compounds of the above formulae may be prepared from pure raw materials. However, these novel compounds may be diluted with innocuous, inert materials, thereby permitting the use of technical grades of materials or intermediates in their preparation.

Any suitable reaction temperatures may be employed. It is ordinarily preferred to use room or slightly elevated temperatures of the order up to about 200° C.

The use of inert organic solvents as a medium for a reaction such as toluene, benzene, methyl alcohol, etc., is contemplated. The presence of such solvent facilitates the desired reaction. The solvent may be eliminated from the reaction product at the completion of the reaction by any suitable means. This may be accomplished by vaporizing the solvent under vacuum at elevated temperatures. Pressures of about 2 to 30 mm. at temperatures at 75° C. to 160° C. are satisfactory in effecting the removal of toluene or like solvent from the reaction product.

By these procedures, the novel compounds of this invention can be obtained in almost theoretical yields. These yields are indicative that it is not necessary to use an excess of either reactant, the total amount of starting materials being subsantially utilized in the formation of the final reaction product.

Polymers or resins which may be stabilized by practice of this invention include halogen-containing organic polymers typically those which contain chlorine atoms bonded to the polymer chain. These polymers include polyvinyl chloride-type polymers, e.g. polyvinyl chloride, polyvinylidene chloride, etc. They may also include copolymers formed by the copolymerization of vinyl chloride or vinylidene chlorine with each other or with other ethylenically unsaturated monomers. Ethylenically unsaturated monomers may be compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleates esters, etc.

The polymers may be either "rigid" or "flexible." When "rigid" polymers are employed, they may include impact modifiers, pigments and/or fillers, lubricants, etc., in addition to the resin and stabilizer. When "flexible" polymers are employed, they may include plasticizer (primary and secondary), pigments and/or fillers, lubricants, etc., in addition to the resin and stabilizer.

In general the synthetic resins which can be stabilized according to this invention include the following polymers which may or may not be mixed with other stabilizers, additives, flameproofing agents, dyes, pigments, etc.:

(a) Homopolymer of vinyl chloride,
(b) Homopolymer of vinylidene chloride,
(c) Copolymers of vinyl chloride and acrylonitrile,
(d) Copolymers of vinylidene chloride and acrylonitrile,
(e) Copolymers of vinylidene chloride, acrylonitrile and N-isopropylacrylamide,
(f) Copolymers of vinyl chloride and vinyl acetate,
(g) Copolymers of vinyl chloride, acrylonitrile and N-butyrylacrylamide,
(h) Copolymers of vinyl chloride, methyl methacrylate and vinyl acetate,
(i) Copolymers of vinyl chloride or vinylidene chloride with acrylonitrile and N-vinylpyridine,
(j) Copolymers of vinyl chloride or vinylidene chloride with acrylonitrile mixed with a homopolymer of an N-alkylacrylamide (e.g. N-isopropylacrylamide, N-octylacrylamide, etc.),
(k) Copolymers of vinyl chloride or vinylidene chloride with acrylonitrile mixed with a homopolymer or copolymer of α-vinylpyrrolidone,
(l) Copolymers of vinyl chloride or vinylidene copolymers of an N-alkylacrylamide and acrylonitrile,
(m) Other copolymers and mixtures of homopolymers or copolymers of vinyl chloride and/or vinylidene chloride with or without other monoolefinically unsaturated polymerizable monomers containing from 2 to 20 or more carbon atoms, especially those containing from 2 to 8 carbon atoms and no more than one nitrogen atom and no more than 2 oxygen atoms.

The methods for preparing the synthetic resins described above are well known and such methods and a great variety of such synthetic resins are described in the prior art. These synthetic resins are useful in preparing fibers, films, molding compositions, coating materials, wrapping materials, electrical insulation, fabrics, rope, plastic pipe, paints, laminating materials for safety glass, adhesives, etc. Synthetic resins as stabilized in accordance with this invention are especially advantageous in synthetic fibers and products made therefrom such as rugs, wearing apparel, draperies, seat covers, upholstery, rope, cigarette filters, etc. Resistance to weathering (e.g. moisture and ultraviolet light) is especially important for items exposed to out of doors conditions. Resistance to ultraviolet light is also important for rugs, draperies, automobile seat covers, porch furniture upholstery and the like which may receive considerable sunlight.

Typically the compounds of this invention are used in amounts of 0.05 to 10 parts by weight of 100 parts by weight of halogen-containing, typically vinyl chloride, resins. Preferably they are used in the amount of 0.025–3 parts per 100 parts of halogen-containing resin. Thus the preferred heat-stable vinyl chloride polymer compositions of this invention comprise 100 parts by weight of a vinyl chloride polymer a stabilizing amount, typically 0.05–10 parts of a novel compound of this invention.

The novel heat and light stable compositions of this invention may be formulated by such techniques as milling, dry blending, Banbury blending, or any other commonly employed formulating techniques. Whatever formulating technique be employed, it will be desirable to substantially complete and uniformly disperse the novel stabilizing compound throughout the vinyl chloride polymer composition.

It is a feature of the novel stabilizer of this invention that it permits attainment of stabilized halogen-containing polymers and resins, particularly vinyl halide polymers such as vinyl chloride, characterized by their resistance to the deteriorative effect of heat. The degrees of stabilization attained in such systems are considerably in excess of that previously attainable by any prior art stabilizer system.

Because of the outstanding properties of these novel compounds, it is possible to effect stabilization with lower quantities and thereby to obtain a more effective system on a cost-performance basis.

The following examples are for purposes of illustration and are not to be considered limitative.

EXAMPLE 1

92.7 grams (0.15 mole) of monobutylmonochlorotin S,S' bis(isooctyl mercaptoacetate) and 37.4 grams (0.15 mole) of dibutyltin oxide in 100 milliliters of toluene were heated to a temperature of 115° C. and maintained at that temperature for one hour. The recovered product exhibited a weight of 128 grams and, upon analysis, assayed 26.75% tin and 7.37% sulfur. The product exhibited the formula:

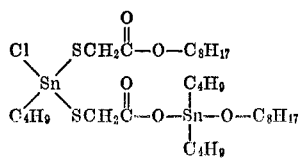

EXAMPLE 2

92.7 grams (0.15 mole) of monobutylmonochlorotin S,S' bis(isooctyl mercaptoacetate) and 74.7 grams (0.3 mole) of dibutyltin oxide in 100 milliliters of toluene were heated to a temperature of 120° C. over a time interval of 60 minutes. The recovered product exhibited a weight of 166 grams and, upon analysis, assayed 32.07% tin. The product corresponded to the formula:

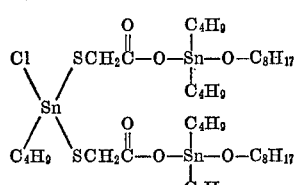

EXAMPLE 3

15.5 grams (0.025 mole) of monobutylmonochlorotin S,S' bis(isooctyl mercaptoacetate) and 6.25 grams (0.025 mole) of dibutyltin oxide in 30 milliliters of toluene were heated to a temperature of 92° C., for a time interval of 15 minutes. The solvent was removed by evaporation. The recovered product exhibited a weight of 21.5 grams. The product corresponded to the formula:

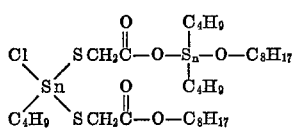

EXAMPLE 4

15.5 grams (0.025 mole) of monobutylmonochlorotin S,S' bis(isooctyl mercaptoacetate) and 4.15 grams (0.025 mole) of dimethyltin oxide were reacted in 100 milliliters of xylene and were heated to a temperature of 100° C., which temperature was incrementally increased to a temperature of 120° C. over a time interval of 60 minutes. The recovered product exhibited a weight of 17.6 grams and, upon analysis, assayed 29.23% tin. The product corresponded to the formula:

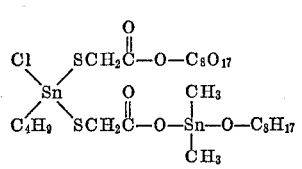

EXAMPLE 5

96.9 grams (0.15 mole) of monobutylmonochlorotin S,S' bis(isooctyl mercaptopropionate) and 74.7 grams (0.3 mole) of dibutyltin oxide in 100 milliliters of toluene were heated to a temperature of 120° C. over a time interval of 60 minutes. The recovered product exhibited a weight of 140 grams and, upon analysis, assayed 31.21% tin and 5.8% sulfur. The product corresponded to the formula:

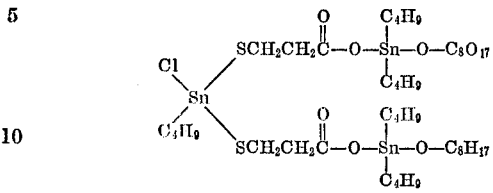

EXAMPLE 6

15.5 grams (0.025 mole) of monobutylmonochlorotin S,S' bis(isooctyl mercaptoacetate) and 6.25 grams (0.025 mole) of dibutyltin oxide in 100 milliliters of toluene were heated to a temperature of 100° C., which temperature was incrementally increased to a temperature of 120° C., over a time interval of 60 minutes. The recovered product exhibited a weight of 21.5 grams and, upon analysis, assayed 28.17% tin. The product corresponded to the formula:

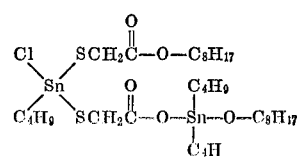

The novel stabilizers of this invention are also operable in a synergistic combination with secondary stabilizers of the formula $R_2Sn(SR')_2$ wherein R is a hydrocarbon radical selected from the group consisting of alkyl, cycloalkyl, aralkyl, alkaryl, and aryl, R' is a residue of a carboxylic acid ester, or a radical selected from the same group as R.

This invention also relates to stabilizing compositions; to stabilized polymers; and to the process for preparing a novel halogen containing polymer stabilized against the deteriorative effect of heat which comprises adding to a halogen-containing resin a stabilizing amount of: a first stabilizer consisting of a novel compound exhibiting the formula:

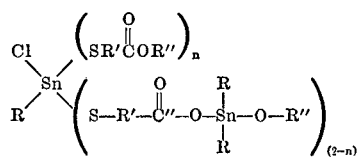

wherein R, R' and R" are hydrocarbons and $n$ is 0 or 1, and a second stabilizer $R_2Sn(SR')_2$ wherein R is a hydrocarbon radical selected from the group consisting of alkyl, cycloalkyl, aralkyl, alkaryl, and aryl, R' is a residue of a carboxylic acid ester, or a radical selected from the same group as R.

The second stabilizer operable in the practice of this invention is a compound of the formula $R_2Sn(SR')_2$. In this formula R is a hydrocarbon radical selected from the group consisting of alkyl, cycloalkyl, aralkyl, alkaryl, and aryl. R' may be selected from the same group as R or it may also be a residue of a carboxylic acid ester —R"COOR'". In these formulae R'", R" (which may be the same as each other or different) may be selected from the same group as R is selected from. Typical second stabilizers include:

dioctyltin S,S' bis(isooctyl mercaptoacetate)
dibutyltin S,S' bis(lauryl mercaptide)
dibutyltin S,S' bis(octyl mercaptide)
dibutyltin S,S' bis(benzyl mercaptide)
dibutyltin S,S' bis(xylyl mercaptide)
dibutyltin S,S' bis(cyclohexyl mercaptide)
dibutyltin S,S' bis(phenyl mercaptide)
dioctyltin S,S' bis(lauryl mercaptide)
dioctyltin S,S' bis(octyl mercaptide)
dioctyltin S,S' bis(benzyl mercaptide)
dioctyltin S,S' bis(xylyl mercaptide)
dioctyltin S,S' bis(cyclohexyl mercaptide)
dicyclohexyltin S,S' bis(lauryl mercaptide)
dimethyltin S,S' bis(lauryl mercaptide)
dimethyltin S,S' bis(benzyl mercaptide)
dimethyltin S,S' bis(cyclohexyl mercaptide)
dimethyltin S,S' bis(xylyl dimercaptide)
dibutyltin S,S' bis(isooctyl mercaptoacetate)
dioctyltin S,S' bis(isooctyl mercaptoacetate)
dicyclohexyltin S,S' bis(isooctyl mercaptoacetate)
dimethyltin S,S' bis(isooctyl mercaptoacetate)
diphenyltin S,S' bis(isooctyl mercaptoacetate)
dibutyltin S,S' bis(lauryl mercaptoacetate)
dibutyltin S,S' bis(benzyl mercaptoacetate)

Thus a preferred heat-stable vinyl chloride polymer composition of this invention comprises 100 parts by weight of a vinyl chloride polymer; a stabilizing amount; typically 0.05 to 5 parts of a first stabilizer exhibiting one direct halogen, etc., wherein R is selected from the group consisting of alkyl having 1–20 carbon atoms, aryl, alkaryl, aralkyl, and cycloalkyl; and a second stabilizer $R_2Sn(SR')_2$ wherein R is a hydrocarbon radical selected from the group consisting of alkyl, cycloalkyl, aralkyl, alkaryl, and aryl, R' may be a residue of a carboxylic acid ester, or a radical selected from the same group as R.

The novel heat and light stable compositions of this invention may be formulated by such techniques as milling, dry blending, Banbury blending, or any other commonly employed formulating techniques.

One of the formulating methods which may be particularly convenient involves the formation of a stabilizer composition containing the first stabilizer and the second stabilizer. This stabilizer composition may later be added to, and thoroughly mixed with the vinyl chloride polymer. Where this technique is employed, the stabilizer composition may typically comprise stabilizing amounts of the stabilizers, typically 0.05 to 5 parts by weight of the first stabilizer and 0.1–10 parts by weight of the second stabilizer. Preferably, it may comprise 0.1 to 0.3 parts of the first stabilizer and about 0.5 to 4, say 1.8 parts of the second stabilizer Preferably the second stabilizer is present in an amount at least equal to, and preferably greater than, the amount of said first stabilizer.

Whatever formulating technique be employed, it will be desirable to substantially completely and uniformly disperse the first stabilizer and the second stabilizer throughout the vinyl chloride polymer composition.

It is a feature of the novel stabilizer systems of this invention that it permits attainment of stabilized halogen-containing polymers and resins, particularly vinyl halide polymers such as vinyl chloride characterized by their resistance to the deteriorative effect of heat. The degrees of stabilization attained in such systems may be considerably in excess in that previously attainable by any prior are stabilizer system.

Because of the outstanding properties of this novel stabilizer system, it is possible to effect stabilization with lower quantities and thereby to obtain a more effective system on a cost-performance basis.

In order to illustrate clearly the novel features of this invention and to illustrate the unexpected and outstanding results which may be attained by practice of this invention, the following illustrative examples may be set forth wherein all parts are parts by weight unless otherwise indicated.

In these examples, the rigid vinyl chloride polymer employed was that having a specific gravity of 1.40, a Shore Durometer "D" hardness of 80 and an ultimate tensile strength of about 7,000 p.s.i. sold under the trademark Diamond 450 (or equivalent).

The illustrative first stabilizers employed were the compounds of foregoing Examples 2, 5 and 6. The second stabilizer employed in these examples was dibutyltin bis (isooctyl mercaptoacetate).

The selected compositions were thoroughly blended by placing the polyvinyl chloride on a two-roller differential mill which was oil-heated to a temperature of 175° C. together with the noted quantity of first and second stabilizers, and the mixture was milled for about 5 minutes. A continuous band of the composition formed around one of the rollers. This band was cut and the composition was removed from the hot rollers as a continuous sheet. Squares of this material measuring 2.54 cm. x 2.54 cm. were cut for heat stability testing.

For the heat stability test, the squares were placed in an air oven regulated to maintain a temperature of 190° C. Samples of each composition were removed from the oven at 15 minute intervals and were rated visually as to color change and degradation according to the following scale:

7—clear, water-white
6—off-white
5—slightest degree of yellowing
4—definite yellow color
3—deep yellow-brown color
2—deep brown color
1—dark brown to black color The length of time in minutes required to reach a value of 3 or less was recorded as the heat stability value.

In Example 8 as hereinafter set forth, 100 parts of the vinyl chloride polymer was tested without addition of any stabilizer and thus may serve as a control. 2.0 parts and no other stabilizer was present. In control Example 9, the second stabilizer was dibutyltin bis(isooctyl mercaptoacetate) present in amount of 2.0 parts and no other stabilizer was present. In Example 10, there were present two stabilizers as follows:

| | Parts |
|---|---|
| Novel compound of Example 2 | 0.2 |
| Dibutyltin bis(isooctyl mercaptoacetate) | 1.8 |
| Total stabilizer | 2.0 |

The results of the heat stability tests are presented in Table I as follows:

TABLE I

| Example | Heat stability value in minutes | Color after milling |
|---|---|---|
| 8 | No heat stability stuck to mill after 1 minute. | 1 |
| 9 | 55 | 7 |
| 10 | 70 | 7 |

From Table I, it will be apparent that Example 10, prepared in accordance with this invention, is outstandingly superior to the control Examples 8 and 9. It has a heat stability value of 70 minutes which is greater than that of the controls. Thus, the novel composition will be effective for as much as forty percent longer than the best prior art control system. Furthermore, it is noted that the color after milling is, clear water-white, which indicates no change in color during milling.

In further examples, the heat stability values and color after milling was determined for other preferred systems utilizing other stabilizers as follows:

EXAMPLE 11

| | Parts |
|---|---|
| Vinyl chloride polymer | 100 |
| Novel compound of Example 5 | 0.2 |
| Dibutyltin bis(isooctyl mercaptoacetate) | 1.8 |

EXAMPLE 12

| | |
|---|---|
| Vinyl chloride polymer | 100 |
| Novel compound of Example 6 | 0.2 |
| Dibutyltin S,S' bis(isooctyl mercaptoacetate) | 1.8 |

The results of the heat stability tests are presented in Table II as follows:

TABLE II

| Example | Heat stability value in minutes | Color after milling |
|---|---|---|
| 11 | 70 | 7 |
| 12 | 75 | 7 |

From Table II, it will be apparent that the H.S.V. (heat stability value) of the novel stabilized system is longer than that of the control of Example 7; and the color after milling of the control was 1, a definite black, while that of the experimental was 7.

Although this invention has been illustrated by reference to specific examples, changes therein which clearly fall within the scope of the invention will be apparent to those skilled in the art. It is, therefore, to be limited solely by the scope of the appended claims.

I claim:

1. A compound exhibiting the formula:

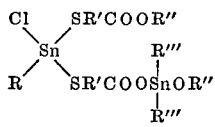

wherein R, R', R" and R'" are individually selected from the group consisting of alkyl, cycloalkyl, aralkyl, alkaryl and aryl hydrocarbon radicals, with the proviso that any alkyl radicals contain fewer than 20 carbon atoms.

2. The compound claimed in claim 1 wherein R is alkyl.

3. The compound claimed in claim 1 which has the formula:

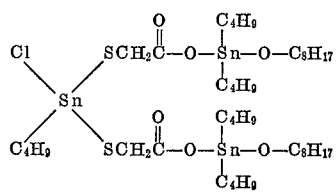

4. The compound claimed in claim 1 which has the formula:

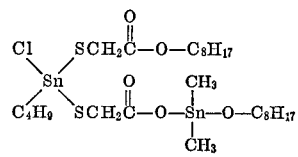

References Cited
UNITED STATES PATENTS

| | | | |
|---|---|---|---|
| 3,478,071 | 11/1969 | Weisfeld | 260—429.7 |
| 3,665,025 | 5/1972 | Wowk | 260—429.7 |

WERTEN F. W. BELLAMY, Primary Examiner

U.S. Cl. X.R.

260—45.75 K